United States Patent [19]

Masaki et al.

[11] Patent Number: 4,665,490

[45] Date of Patent: May 12, 1987

[54] ANTISKID CONTROL WITH SURFACE FRICTION COMPENSATION BY PROLONGED DOWN-PRESSURE OPERATION

[75] Inventors: Syouichi Masaki; Kimio Tamura, both of Anjo; Teruyoshi Wakao; Noriyuki Nakashima; Ken Asami; Kazunori Sakai, Nagoya, all of Japan

[73] Assignees: Nippondenso Co., Ltd., Kariya; Toyota Jidosha Kabushiki Kaisha, Toyota, both of Japan

[21] Appl. No.: 638,722

[22] Filed: Aug. 8, 1984

[30] Foreign Application Priority Data

Aug. 9, 1983 [JP] Japan .................. 58-145259

[51] Int. Cl.⁴ .................. B60T 8/34; B60T 8/78; B60T 8/88
[52] U.S. Cl. .................. 364/426; 303/100; 303/103; 303/110
[58] Field of Search ............ 364/426; 303/93, 95, 303/97, 99, 100, 103, 105, 106, 110

[56] References Cited

U.S. PATENT DOCUMENTS

| | | | |
|---|---|---|---|
| 3,804,469 | 4/1974 | Takeuchi et al. | 303/106 |
| 4,140,353 | 2/1979 | Riordan | 303/97 |
| 4,168,866 | 9/1979 | McNinch et al. | 303/103 |
| 4,269,454 | 5/1981 | White et al. | 303/97 |
| 4,335,431 | 6/1982 | Takahashi | 364/426 |
| 4,353,601 | 10/1982 | Jones | 364/426 X |
| 4,392,202 | 7/1983 | Matsuda | 364/426 |
| 4,395,761 | 7/1983 | Sato et al. | 364/426 |
| 4,425,622 | 1/1984 | Arikawa | 364/426 |
| 4,446,522 | 5/1984 | Sato et al. | 364/426 |
| 4,466,066 | 8/1984 | Saumweber et al. | 364/426 |
| 4,530,059 | 7/1985 | Brearley et al. | 364/426 |

FOREIGN PATENT DOCUMENTS

| | | |
|---|---|---|
| 0050280 | 4/1982 | European Pat. Off. |
| 2462314 | 2/1981 | France |
| 2476008 | 8/1981 | France |

*Primary Examiner*—Felix D. Gruber
*Attorney, Agent, or Firm*—Cushman, Darby & Cushman

[57] ABSTRACT

In an antiskid control system for a motor vehicle, the speed and acceleration of at least one vehicle wheel are detected, and from the detected wheel speed, the speed of the vehicle is estimated. First and second variable threshold values are derived from the vehicle speed. The wheel speed and acceleration are compared with the first and second thresholds, respectively, to estimate the level of road surface friction and to operate solenoid-operated hydraulic brake pressure decreasing means. The operating period of the pressure decreasing means is controlled in accordance with the estimated road surface friction to prevent excessive reduction of the brake pressure and premature locking of the wheels.

4 Claims, 18 Drawing Figures

FIG.13

| FRICTION | WHEEL SPEED | ACCELERATION | SOL-M | SOL-S | MODE |
|---|---|---|---|---|---|
| HIGH (Sb=0) | $V_w \geq V_{sk}$ | $G_1 > A_w$ | ON | OFF | GRD-DW |
| | | $G_2 > A_w \geq G_1$ | OFF | OFF | GRD-UP |
| | | $G_3 > A_w \geq G_2$ | OFF | OFF | RPD-UP |
| | | $A_w \geq G_3$ | OFF | ON | RPD-DW |
| | $V_w < V_{sk}$ | $G_1 > A_w$ | ON | ON | RPD-DW |
| | | $G_2 > A_w \geq G_1$ | ON | OFF | GRD-DW |
| | | $G_3 > A_w \geq G_2$ | OFF | OFF | GRD-UP |
| | | $A_w \geq G_3$ | OFF | ON | RPD-UP |
| MEDIUM (Sb=1) | $V_w > V_{sk}$ | $G_1 > A_w$ | ON | OFF | GRD-DW |
| | | $G_2' > A_w \geq G_1$ | OFF | OFF | GRD-UP |
| | | $G_3 > A_w \geq G_2'$ | OFF | OFF | RPD-UP |
| | | $A_w \geq G_3$ | OFF | ON | RPD-DW |
| | $V_w < V_{sk}$ | $G_1 > A_w$ | ON | ON | RPD-DW |
| | | $G_2' > A_w \geq G_1$ | ON | OFF | GRD-DW |
| | | $G_3 > A_w \geq G_2'$ | OFF | OFF | GRD-UP |
| | | $A_w \geq G_3$ | OFF | ON | RPD-UP |
| LOW (Sb=2) | $V_w > V_{sk}$ | $G_1 > A_w$ | ON | ON | RPD-DW |
| | | $G_2' > A_w \geq G_1$ | ON | ON | GRD-DW |
| | | $G_3 > A_w \geq G_2'$ | ON | OFF | GRD-UP |
| | | $A_w \geq G_3$ | OFF | ON | RPD-UP |

$G_2' > G_1$

ANTISKID CONTROL WITH SURFACE FRICTION COMPENSATION BY PROLONGED DOWN-PRESSURE OPERATION

BACKGROUND OF THE INVENTION

The present invention relates to an antiskid control system.

Since the amount of wear of the vehicle wheels and the material that comprises the wheels largely affects their coefficient of friction with road surfaces, difficulty has been encountered in providing optimum control when releasing brake pressure under varying road surface frictions.

SUMMARY OF THE INVENTION

Accordingly, the present invention provides an antiskid control system which is capable of detecting the level of road surface friction for optimizing control of the hydraulic brake pressure.

In the antiskid control system of the invention, the speed and acceleration of at least one vehicle wheel are detected and, from the detected wheel speed, the speed of the vehicle is estimated. First and second variable threshold values are derived from the vehicle speed. The wheel speed and acceleration are compared with the first and second thresholds, respectively, to estimate the level of road surface friction and to operate a pressure decreasing means. The operating period of the pressure decreasing means is controlled in accordance with the estimated road surface friction. Excessive reduction of the brake pressure and premature locking of the wheels are prevented.

BRIEF DESCRIPTION OF THE DRAWINGS

The present invention will be described in further detail with reference to the accompanying drawings, in which:

FIG. 13 is an illustration of various solenoid operation modes in relation to different combinations of surface friction and results of comparison between wheel speed and acceleration with threshold levels;

DETAILED DESCRIPTION

Figure 1:
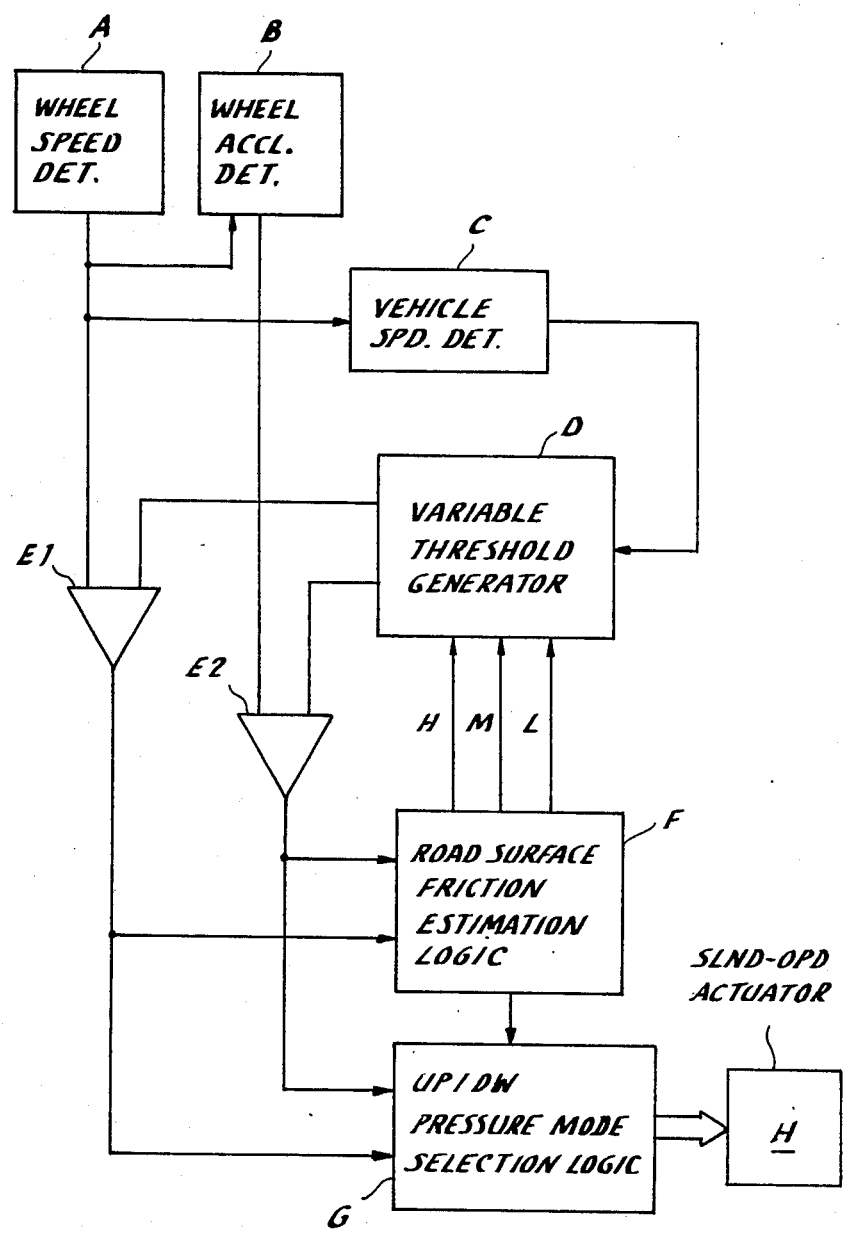
FIG. 1 is a schematic illustration of an antiskid control system embodying the invention.

The antiskid control system of the present invention is represented schematically in FIG. 1 and comprises generally a plurality of wheel speed detectors A (only one of which is shown), at least one wheel acceleration detector B which derives an acceleration value of the wheel from the speed value detected by wheel speed detector A, and a vehicle speed detector C which estimates the speed of the vehicles based on the maximum value of the wheel speeds detected by detectors A. The signal representing the vehicle speed is applied to a variable threshold generator D. Threshold generator D generates at least one speed threshold for determination of down-pressure timing and at least one acceleration threshold for determination of the down-pressure timing. The threshold values derived by generator D are variable as a function of the estimated vehicle speed and are fed to comparators E1 and E2 respectively for comparison with wheel speed and wheel acceleration values derived in the detectors A and B. The outputs of the comparators E1 and E2 are applied to a road surface friction estimation logic F to permit it to estimate levels of surface friction of the road on the basis of the outputs of the comparators E1 and E2 and generates first, second and third values respectively representing high, medium and low levels of road surface friction, the first, second and third values being applied to threshold generator D to cause it to vary the speed and acceleration thresholds according to the estimated level of road surface friction.

The outputs of comparators E1 and E2 are also applied to an up-down pressure mode selection logic G which selects various operating modes of solenoid-operated brake pressure applying means H according to the outputs of the comparators E1 and E2 which are derived immediately following the estimation of the road surface friction.

Figure 2:
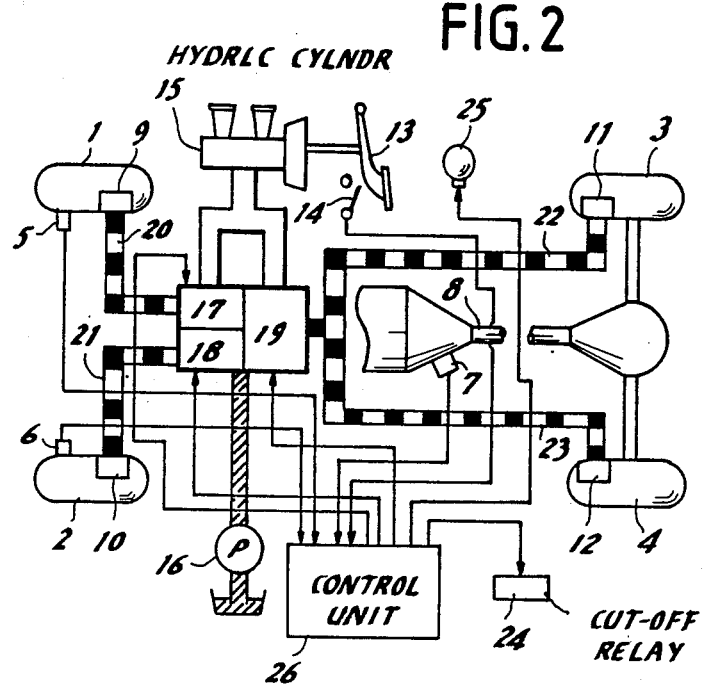
FIG. 2 is an illustration of the mechanical components of the antiskid control system.

In FIG. 2, the antiskid control system is shown incorporated in a rear drive vehicle. Wheel speed sensors 5 and 6 on the front-right and front-left wheels 1 and 2 provide front wheel speed signals independently to a control unit 26, and a rear wheel speed sensor 7 is located on a propeller shaft 8 that drives the rear-right and rear-left wheels 3 and 4 to provide an average rear wheel speed to the control unit 26. Pressure control signals are supplied from control unit 26 to solenoid-operated actuators 17, 18, and 19 which in turn control the pressure of hydraulic brakes 9, 10, and 11, 12 mounted on wheels 1, 2, 3, 4 through lines 20, 21, 22, 23, respectively. Brake-pedal ON or OFF signals are fed from a stop switch 14 located in proximity to the brake pedal 13 to the control unit 26. A hydraulic cylinder 15 provides pressurized hydraulic fluid to actuators 17–19 in response to the brake pedal 13 being depressed. Solenoid actuators 17–19 are supplied with a constant hydraulic pressure from a pump 16. Control signals are supplied to the actuators 17–19 through a fail-safe cutoff relay 24 from control unit 26. A warning light 25 is provided to alert vehicle passengers when disconnection has occurred in the circuits to the solenoid actuators and stop switch 14.

Figure 3:
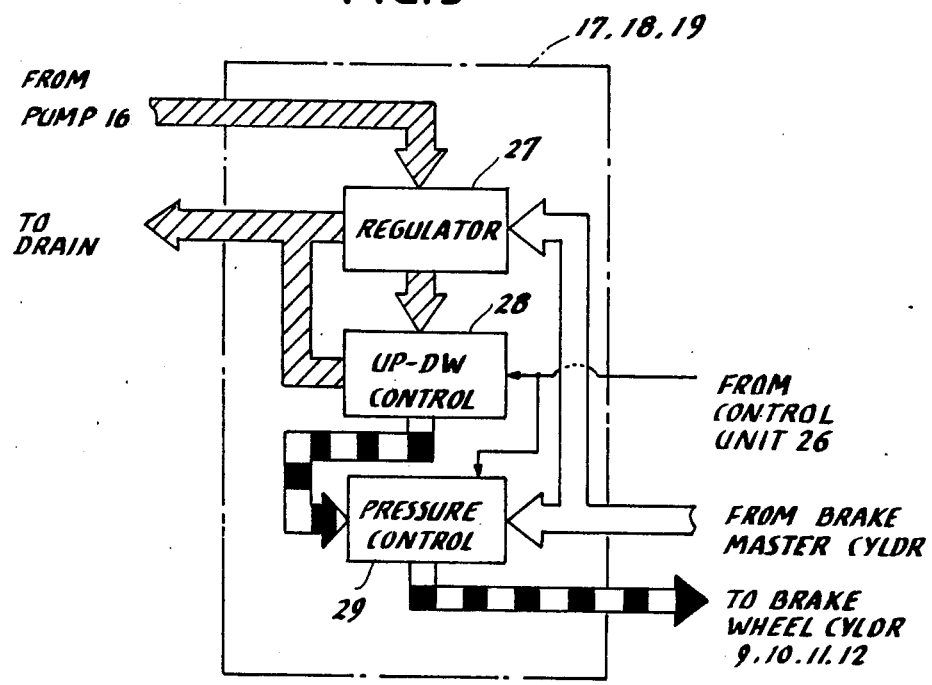
FIG. 3 is a detail illustration of the actuators of FIG. 2.

As illustrated in FIG. 3, each of the solenoid actuators 17–19 comprises a pressure regulator 27 which is connected to the pump 16 to regulate the hydraulic pressure at a constant level. A control valve unit 28 includes a switching solenoid (not specifically illustrated) which provides brake pressure up-down control and a pressure control solenoid that controls the gradient of pressure applied to brakes. A brake pressure controller 29 is provided which includes a switching solenoid that provides a high pressure variation when energized and a low pressure variation when de-energized. The output of controller 29 is connected to the brake wheel cylinder of the associated brake.

Figure 4:
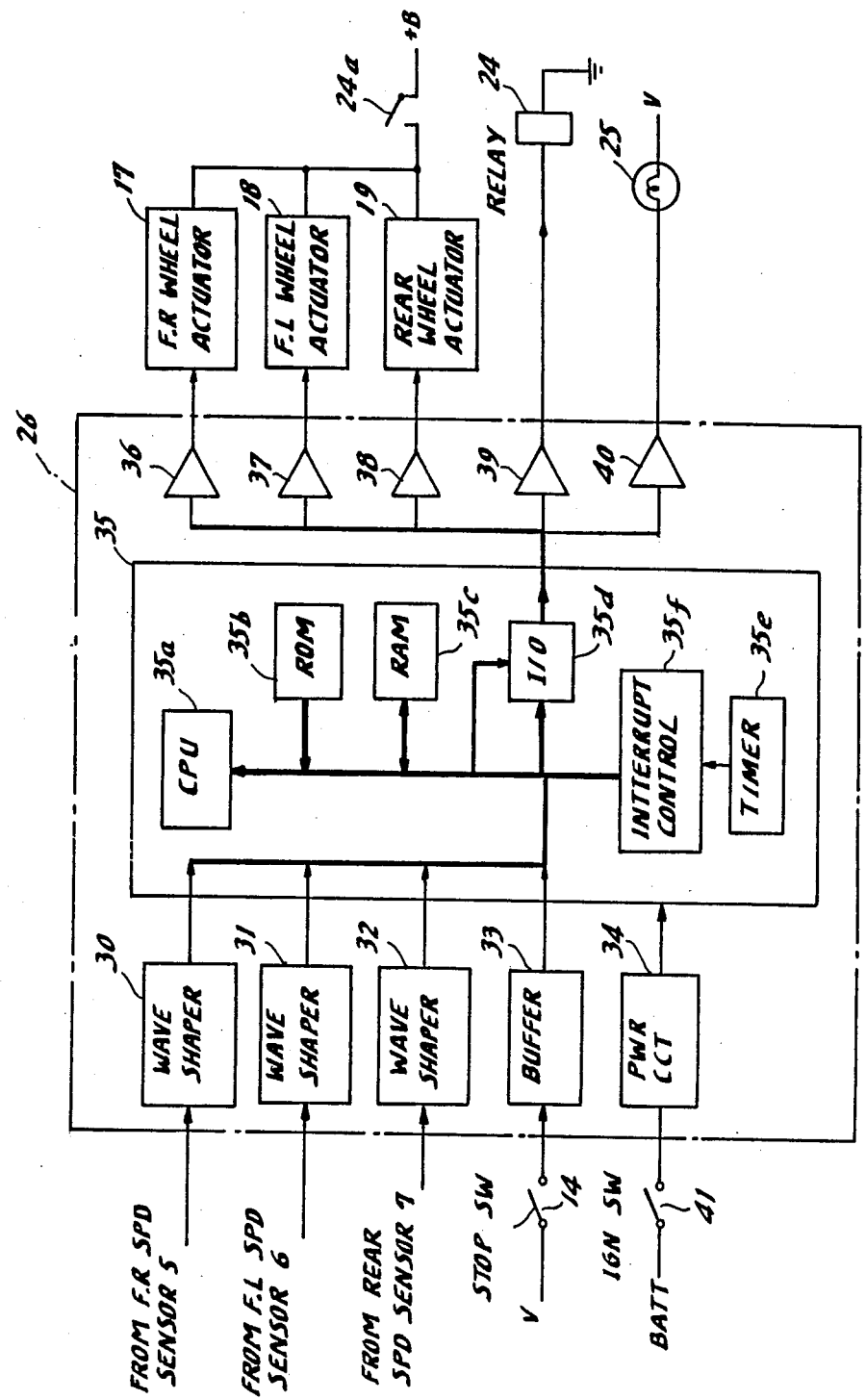
FIG. 4 is a detail illustration of the control unit of FIG. 2.

FIG. 4 is an illustration of the detail of the control unit 26. Wheel speed signals from sensors 5, 6, 7 are shaped into rectangular pulses by waveshaping circuits 30, 31, 32 and the stop signal from switch 14 is fed to a buffer 33. Microcomputer 35, which is powered by circuit 34 in response to the ignition switch 41, includes a microprocessor (CPU) 35a that receives these signals through an input/output port 35d to perform operations according to programmed instructions stored in a read-only memory 35b. Temporary data are stored in a RAM 35c during the processing of input data, which will be described in detail later. Brake control signals from the microcomputer 35 are fed through drivers 36, 37, 38 to the solenoid-operated actuators 17, 18, 19, respectively, which are connected in circuit with the relay contacts 24a of cut-off relay 24 which is energized by a driver 39. A driver 40 energizes the warning light 25 under the control of the microcomputer 35. A timer 35e provides a timing pulse at regular intervals to an interrupt control unit 35f which in response to the timing pulse issues an interrupt command to microprocessor 35a. As will be described later, the microprocessor 35a interrupts its main routine execution to execute a timer interrupt subroutine in which it selects an appropriate brake pressure gradient pattern and operates the actuators 17–19 accordingly.

When the ignition switch 41 is turned on, the microcomputer 35 initiates execution of the instructions stored in ROM 35b. The program shown in FIG. 5 starts with a block 101 where various temporary data such as flags are initialized. Control is passed to a subroutine 102 in which an antiskid control go-ahead decision is made. As shown in FIG. 6, subroutine 102 comprises three successive steps 1021 to 1023 for making decisions by proceeding with a block 1021 in which the microcomputer 35 checks if the antiskid system is functioning properly. In block 1022, vehicle speed Vsb is compared with a reference speed (5 km/h, for example) to detect if the vehicle speed is higher than the reference speed, and in block 1023 the ON-state of stop switch 14 is detected. If these decisions are all affirmative, control is passed to a block 1024 to set go-ahead flag $F_{act}$ and if any one of these decisions is negative control is passed to blocks 1025 and 1026 in succession to reset go-ahead flag $F_{act}$ and control start flag $F_{sta}$, respectively.

The microcomputer 35 then advances to a subroutine 103 to determine the level of road surface friction.

Figure 7:
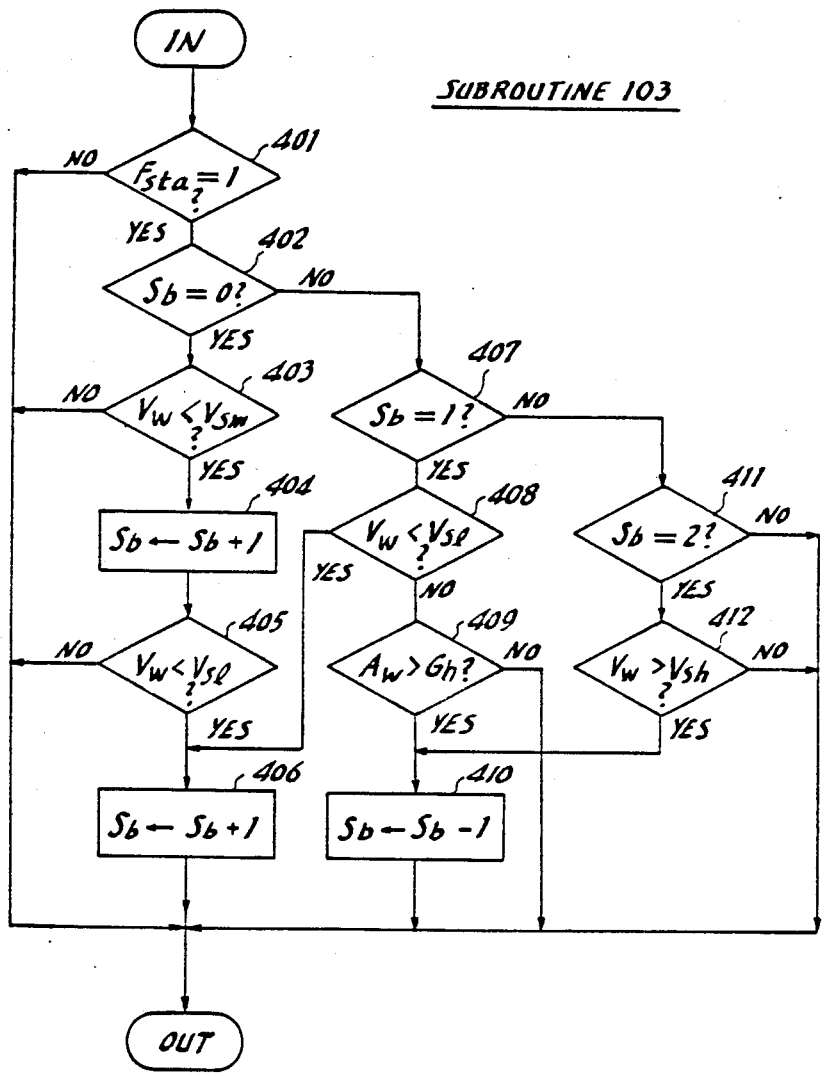
FIG. 7 is a flow diagram describing the road surface friction determination subroutine of FIG. 5.

It is seen in FIG. 7 that subroutine 103 is skipped until start flag $F_{sta}$ is set up which will be described later. With $F_{Sta}=1$ in block 401, control is passed to block 402 to check the contents of a friction level indicator counter Sb. If Sb is zero, the road surface friction is interpreted as "high" and control is passed to block 403 to detect if wheel speed Vw is smaller than a threshold Vsm for determination of medium level surface friction. If the vehicle is running on a high friction road, wheel speed value Vw exceeds the reference Vsm and a "no" decision is taken in block 403 and control is passed to the next subroutine. When wheel speed Vw subsequently reduces to a level below threshold Vsm, control proceeds to block 404 to increment the friction indicator counter Sb by one, so that counter Sb is updated to 1 indicating that the surface friction has changed to a medium level. Control is then passed to block 405 to compare wheel speed value Vw with a lower threshold Vsl which represents a reference which permits determination of a low surface friction level. It is seen that control is passed to block 406 when Vw becomes lower than Vsl to further increment the friction level counter Sb by one, so that counter Sb is renewed to 2 indicating a low suface friction. Blocks 403 to 406 will be executed in succession if a rapid reduction of wheel speed Vw occurs in a single execution of this subroutine.

Immediately after surface friction level has changed from "high" to "medium", control exits from block 402 to 407 in the next execution to check if Sb=1 and proceeds to block 408 to check if wheel speed Vw becomes lower than lower threshold Vsl and control is passed to block 409 to check if wheel acceleration Aw is higher than a higher threshold $G_H$. If Aw is smaller than $G_H$, control is passed to the next subroutine, skipping block 410 and if Aw is greater than $G_H$, block 410 is executed by decrementing the counter Sb by one.

If wheel speed Vw subsequently reduces below Vsl, the decision in block 408 turns to "yes" and control exits to block 406 to increment Sb to 2 to indicate that the friction level has changed to "low".

If wheel acceleration Aw has increased above $G_H$ while the friction level is being interpreted as "medium", the decision at block 409 turns to "yes" and block 410 is executed so that friction indicator Sb is decremented to zero, indicating that friction level has changed from "medium" to "high".

With Sb=2 indicating a low friction level, control is passed through blocks 402 and 407 to block 411 to check if Sb=2 and proceeds to block 412 to perform a comparison of wheel speed Vw with a down-pressure start timing decision threshold Vsh to determine if down-pressure operation is to be effected. Control is then passed to the next subroutine until Vw becomes larger than Vsh. Upon detection of a condition Vw is greater than Vsh, block 410 is executed to decrement counter Sb to 1 to indicate that surface friction has changed from "low" to "medium".

In this way, wheel speed value Vw is compared against a plurality of thresholds Vsh, Vsm, Vsl and the wheel acceleration value Aw is compared against threshold $G_H$ and road surface friction level indicator Sb is updated according to the result of the comparisons to give a high, medium or low friction level indication.

Figure 8:
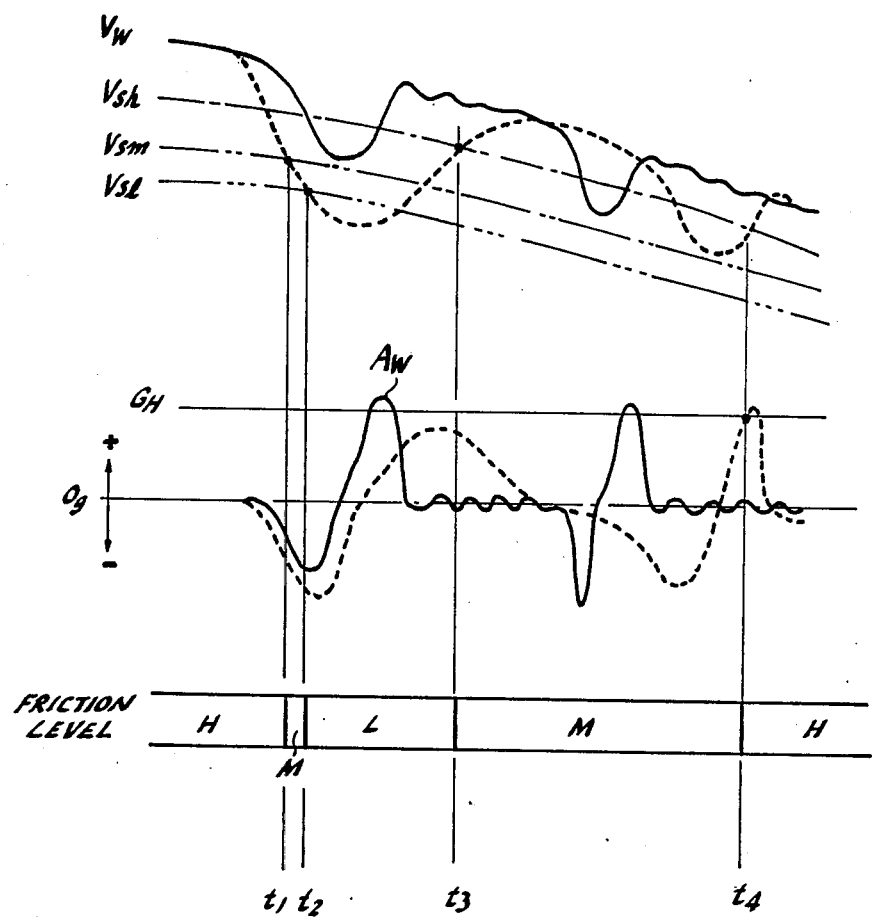
FIG. 8 is a graphic illustration useful for describing the operation of the subroutine of FIG. 7.

The operation of the friction level determination will be better understood with reference to FIG. 8 in which wheel speed and wheel acceleration vary in a typical manner such that the peaks and valleys of wheel speed lag behind the corresponding peaks and valleys of the acceleration. When antiskid control is started, wheel speed Vw decreases and follows a dotted-line curve crossing Vsm at time $t_1$ and Vsl at time $t_2$. During the period between times $t_1$ and $t_2$ the friction level is interpreted as "medium". A further reduction of wheel speed below Vsl changes the friction level indication to "low". A down-pressure operation subsequently occurs and as a result wheel speed rises above Vsh at time $t_3$ whereupon the indication changes to "medium". This medium level indication continues until time $t_4$ whereupon wheel acceleration exceeds threshold $G_H$, causing the indication to change to "high". For purposes of comparison, in FIG. 8, solid-line curves are given to indicate the tendencies of wheel speed and acceleration if a high level surface friction should continue throughout the period between times $t_1$ and $t_4$.

Figure 9:
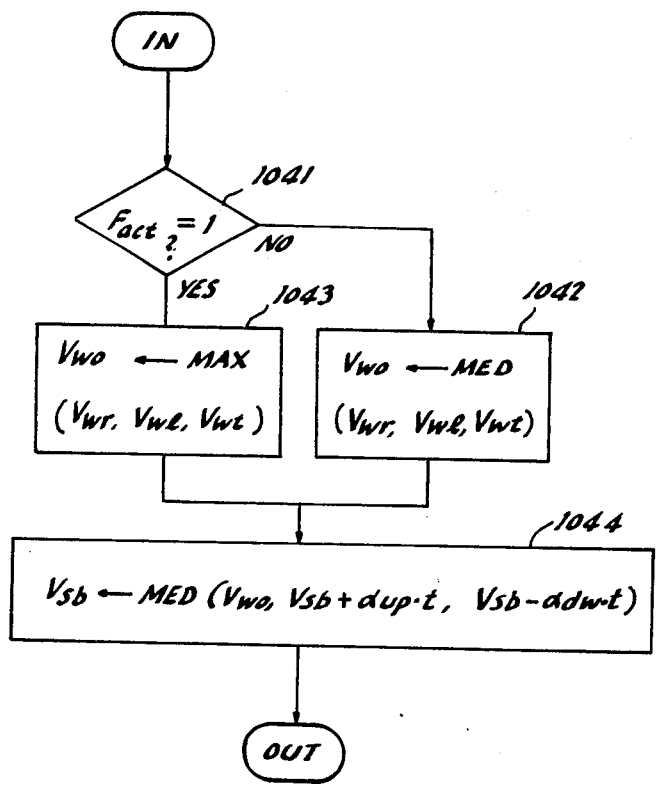
FIG. 9 is a flow diagram describing the vehicle speed determination subroutine of FIG. 5.

In subroutine 104, vehicle speed Vsb is estimated on the basis of wheel speeds according to a program shown in FIG. 9 which commences with block 1041 which checks whether a go-ahead flag $F_{act}$ has been set up. If $F_{act}=0$, control is passed to block 1042 to derive a reference wheel speed value Vwo from a medium value of front-right, front-left and rear wheel speed values Vwr, Vwl, Vwt. If $F_{act}=1$, control is passed to block 1043 to derive the reference wheel speed Vwo from the maximum of these wheel speeds. In a subsequent block 1044, a previously derived vehicle speed value Vsb is trimmed by the amount of vehicle acceleration or deceleration and a medium value of the reference speed Vwo and the trimmed vehicle speeds is detected as an estimated value of current vehicle speed.

Figure 5:
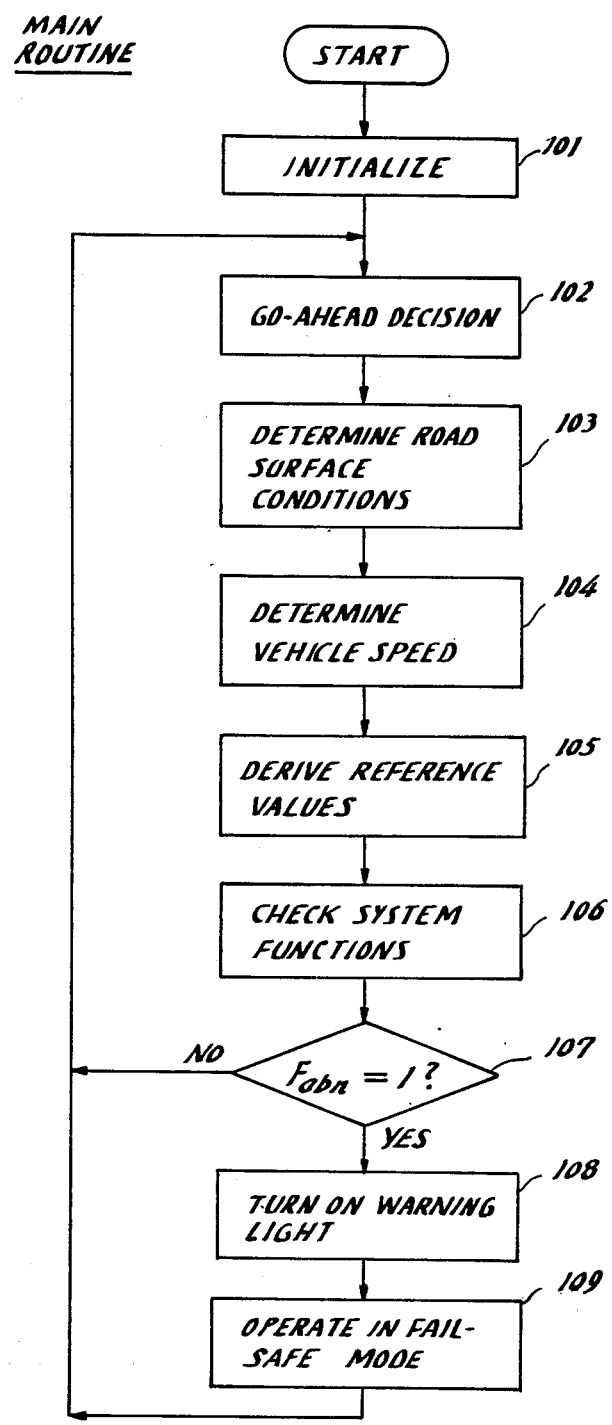
FIG. 5 is an illustration of a flow diagram describing a main routine executed by the microprocessor of FIG. 4.
Figure 6:
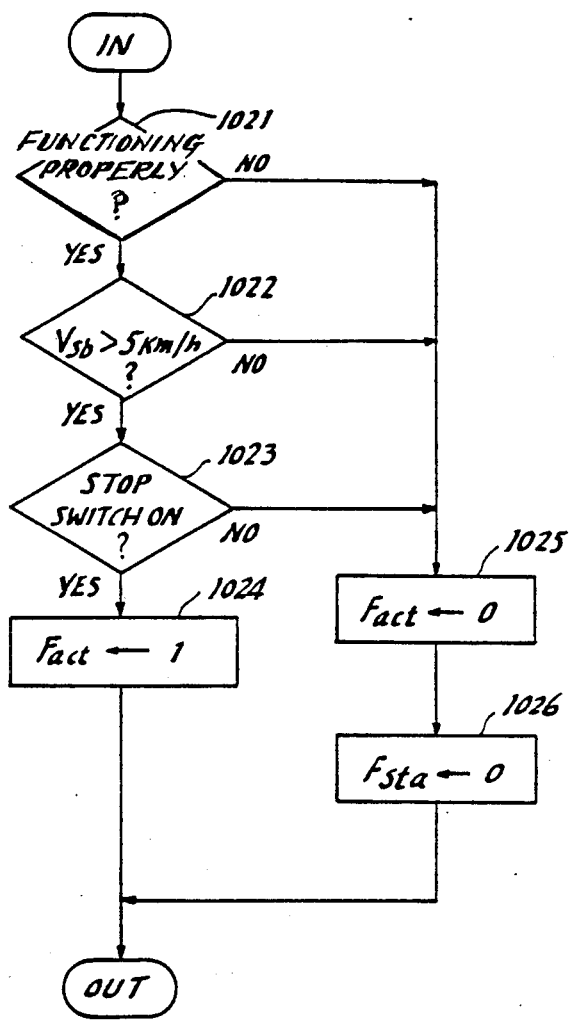
FIG. 6 is a flow diagram of the go-ahead subroutine of FIG. 5.

The microprocessor 35a now proceeds to a subroutine 105, FIG. 5, to derive from vehicle speed Vsb a number of threshold values with which wheel speed and wheel acceleration values are compared to determine down pressure timing. Details of the subroutine 105 are illustrated in FIGS. 10a and 10b.

Figure 10A:
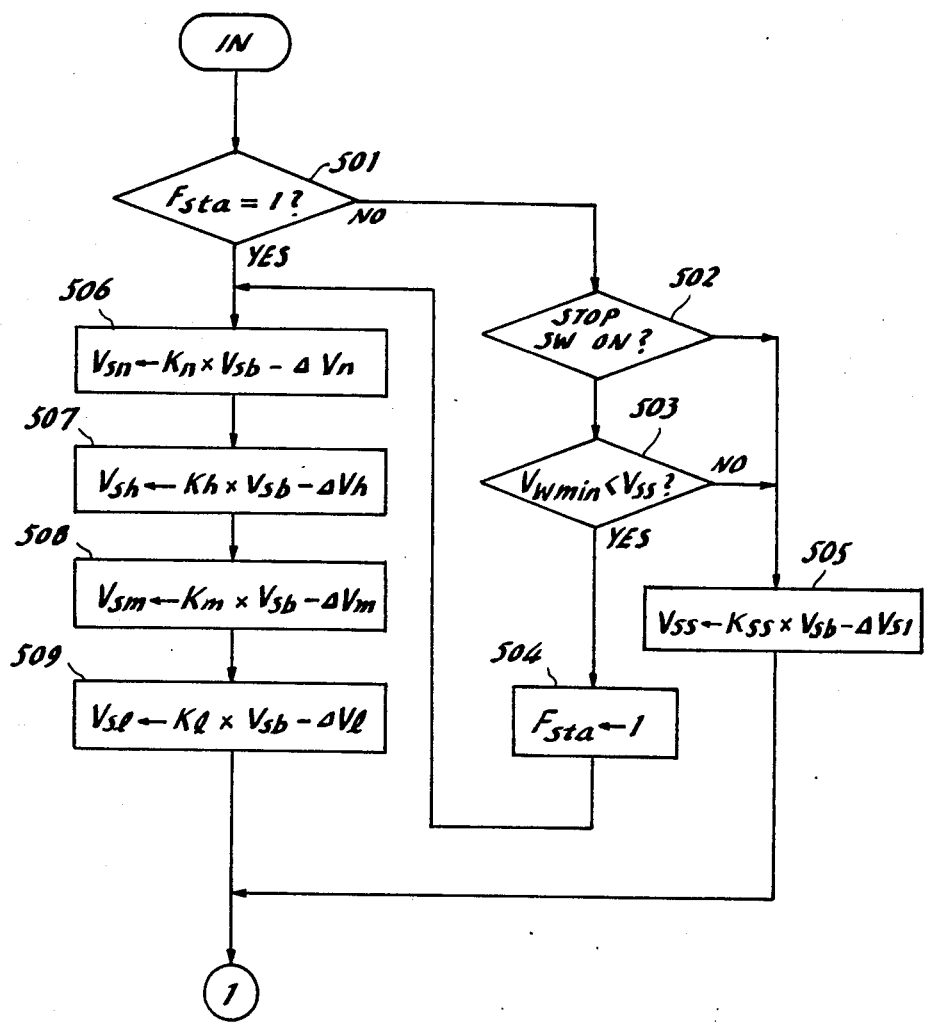
FIGS. 10a and 10b are a flow diagram describing the reference derivation subroutine of FIG. 5.
Figure 10B:
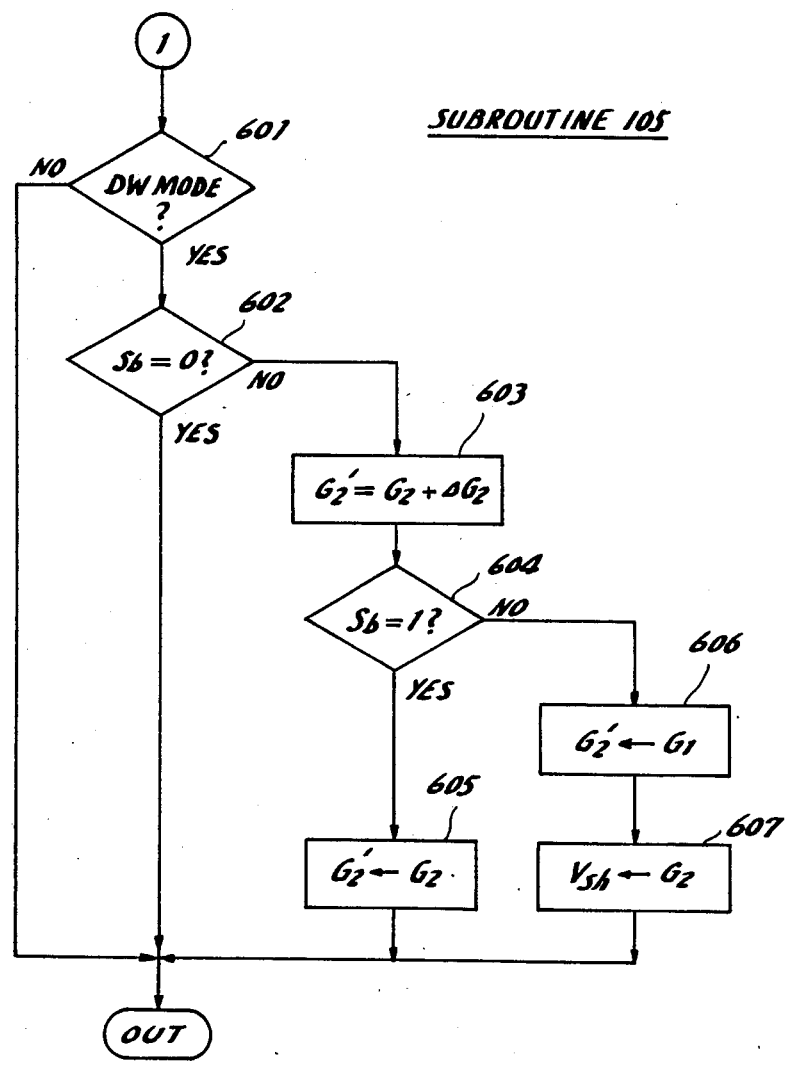

In FIG. 10a, if antiskid control is not yet started, control is passed through block 501 to block 502 to check if stop switch 14 has been turned on and proceeds to block 503 to detect if wheel speed (the minimum Vwmin of the wheel speed values) has reduced below the antiskid start timing decision level Vss. If this decision is taken, control is passed to block 504 to set up flag $F_{sta}$. If this decision is not taken, control is passed to block 505 to update the start decision threshold speed Vss as follows:

$$Vss = Ks \times Vsb - \Delta Vs_1$$

where, Ks is a constant, Vsb is an estimated value of vehicle speed derived in the previous subroutine 104 and $\Delta Vs_1$ represents a variable factor which is a function of the road surface irregularity.

When vehicle speed reduces below Vss, the decision at block 501 changes to "yes" and blocks 506 to 509 are executed in succession. More specifically, in block 506 a road surface noise detection threshold Vsn is derived from the following equation:

$$Vsn = Kn \times Vsb - \Delta Vn$$

where, Kn is a constant and $\Delta Vn$ is a variable coefficient that is a function of the road surface irregularity.

In block 507, the down-pressure start timing threshold Vsh is determined as follows:

$$Vsh = Kh \times Vsb - \Delta Vh$$

where, Kh is a constant and $\Delta Vh$ is a road surface irregularity factor.

In block 508, the medium friction level determination threshold Vsm is derived by $$Vsm = Km \times Vsb - \Delta Vm$$

where, Km is a constant and $\Delta Vm$ is a road surface irregularity factor.

In block 509, the low friction level determination threshold Vsl is determined by $$Vsl = Kl \times Vsb - \Delta Vl$$

where, Kl is a constant and $\Delta Vl$ is a road surface irregularity factor.

The flow diagram shown in FIG. 10b describes an execution by which down-pressure operation end timing threshold is controlled according to the level of road surface friction. If down-pressure operation is being effected, control is passed through block 601 to block 602 to check if Sb=0. If surface friction is high, control is passed to the next subroutine, and if the friction is medium or low, control proceeds to block 603 to set medium acceleration threshold $G_2'$ equal to $G_2 + \Delta G_2$ and goes to block 604 to check if the surface friction is medium and, if so, it goes to block 605 to alter a gradual down-pressure end timing threshold from $G_2$ to $G_2'$ derived in block 603. If the surface friction is "low", a "no" decision is taken at block 604 and control exits to block 606 to change a rapid down-pressure end timing threshold from $G_1$ to $G_2'$, and proceeds to block 607 to change the gradual down-pressure end timing threshold from $G_2$ to Vsh. In this way, during down-pressure operation, its end timing thresholds are determined according to different road surface friction levels.

Figure 11:
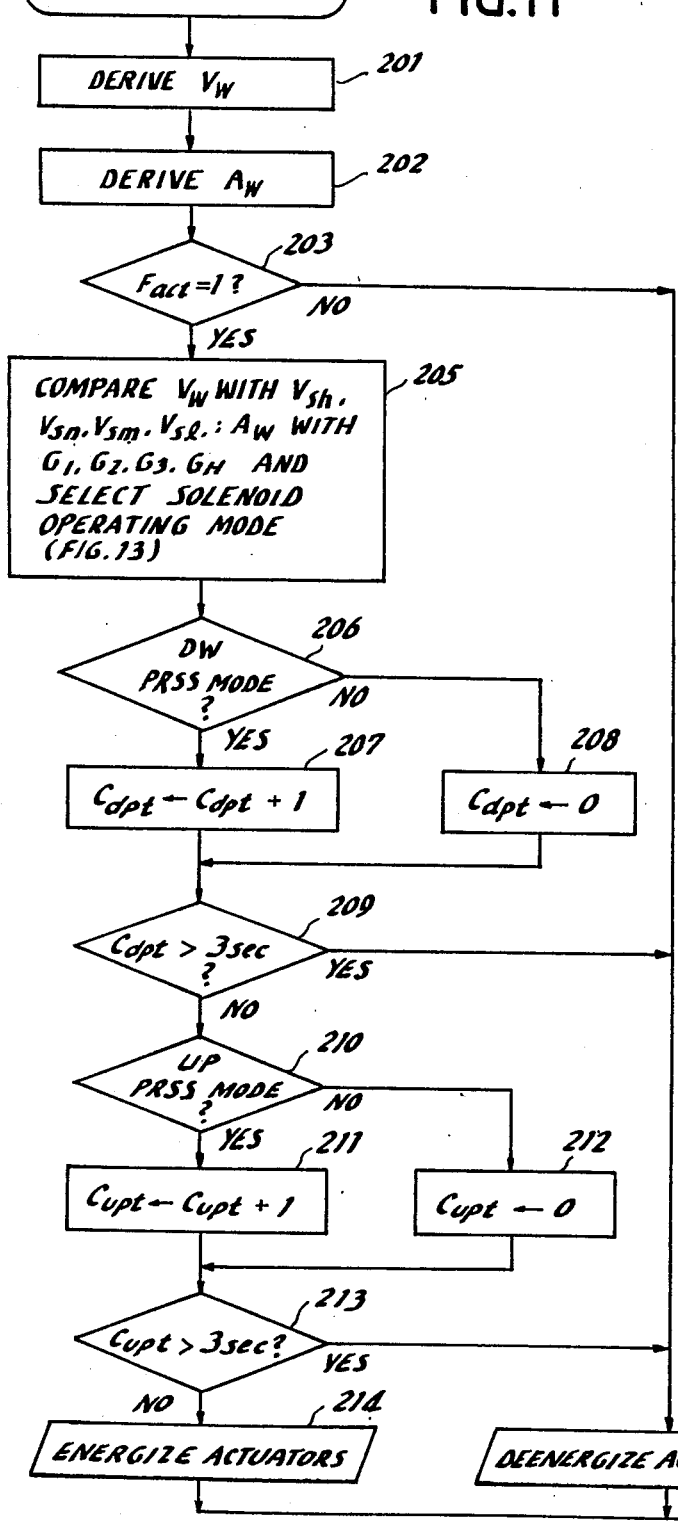
FIGS. 11 and 12 are flow diagrams describing interrupt routines.
Figure 12:
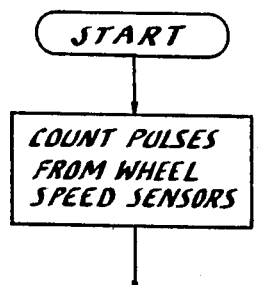

FIG. 11 is an illustration of a timer interrupt subroutine which is executed at regular intervals during program execution of the main routine. The interrupt routine starts with block 201 in which wheel speed Vw is determined for each of the wheels based on data derived in a wheel speed interrupt routine shown in FIG. 12 by which the main routine is also interrupted in response to the occurrence of each wheel speed pulse. More specifically, three wheel speed interrupt programs are provided having different priorities to count simultaneously occurring wheel speed pulses at different timing and store the count values in addressible locations of the RAM. In block 201, the counted wheel speed pulses are read from the RAM to detect the difference between the wheel speed count of the previous execution and that derived in the current execution to derive a wheel speed digital value. Wheel acceleration Aw is derived in block 202 by taking a difference between wheel speed values successively derived from each wheel. In blocks 201 and 202, digital filtering techniques may be employed to smooth out insignificant fluctuations.

Control is now passed to block 203. If the go-ahead decision is not present, control is jumped to block 204 to deenergize actuators 17-19 so that they return to inoperative state immediately following the go-ahead flag $F_{act}$ being reset. If $F_{act}=1$ in block 203, control is passed to block 205 to compare wheel speed and acceleration values Vw, Aw with reference values Vsh, Vsm, Vsl, $G_1$, $G_2$, $G_3$ and $G_H$ and select a solenoid operating mode according to different combinations of the results of the comparison and the detected road surface frictions as seen in FIG. 13. In rapid down-pressure modes, up/-down pressure control solenoid SOL-M and rapid-gradual switching solenoid SOL-S are simultaneously energized, and in gradual down-pressure operation solenoid SOL-M is energized and solenoid SOL-L is deenergized. Likewise, exclusive energization of solenoid SOL-S causes a rapid up-pressure operation, and simultaneous denergization of the solenoids causes a gradual up-pressure operation.

Figure 14:
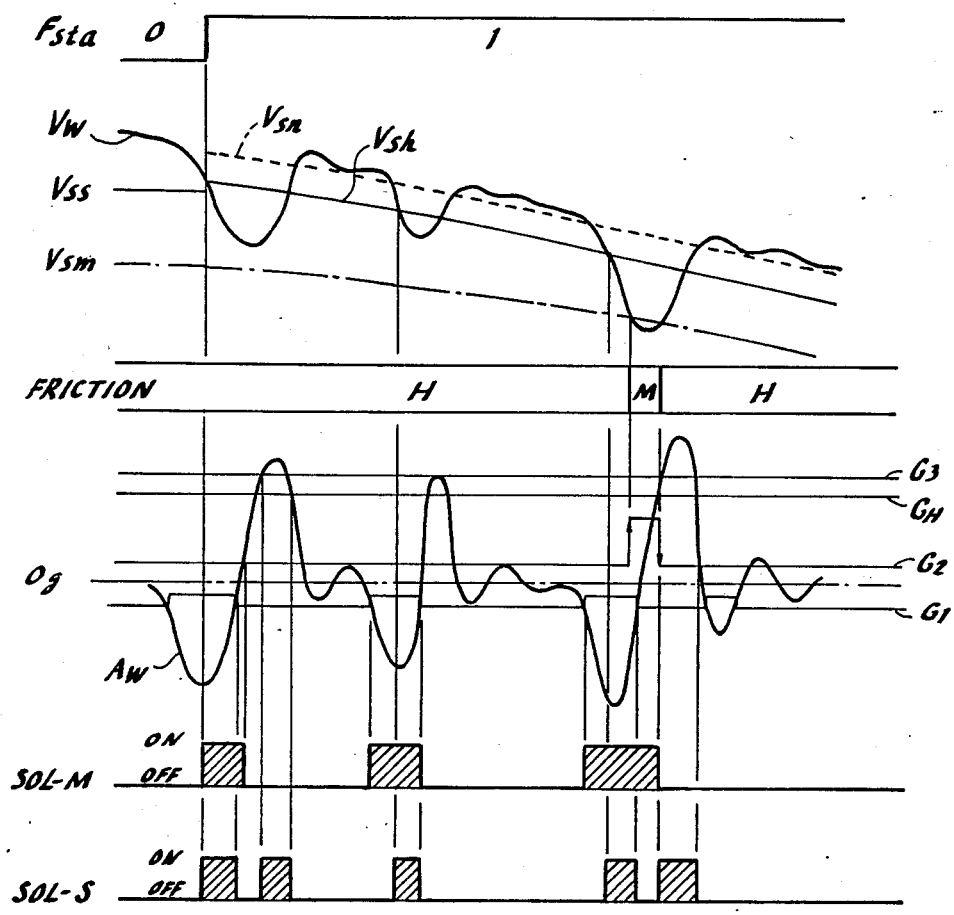
FIGS. 14 to 16 are graphic illustrations useful for describing the operation of the present invention.
Figure 15:
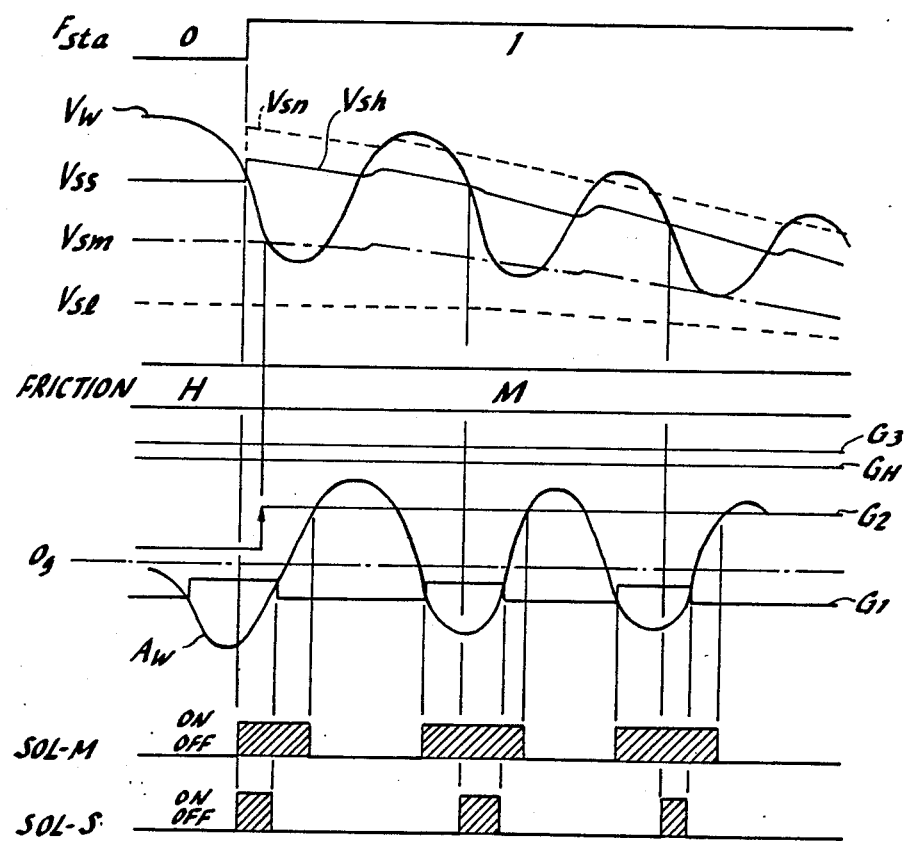
Figure 16:
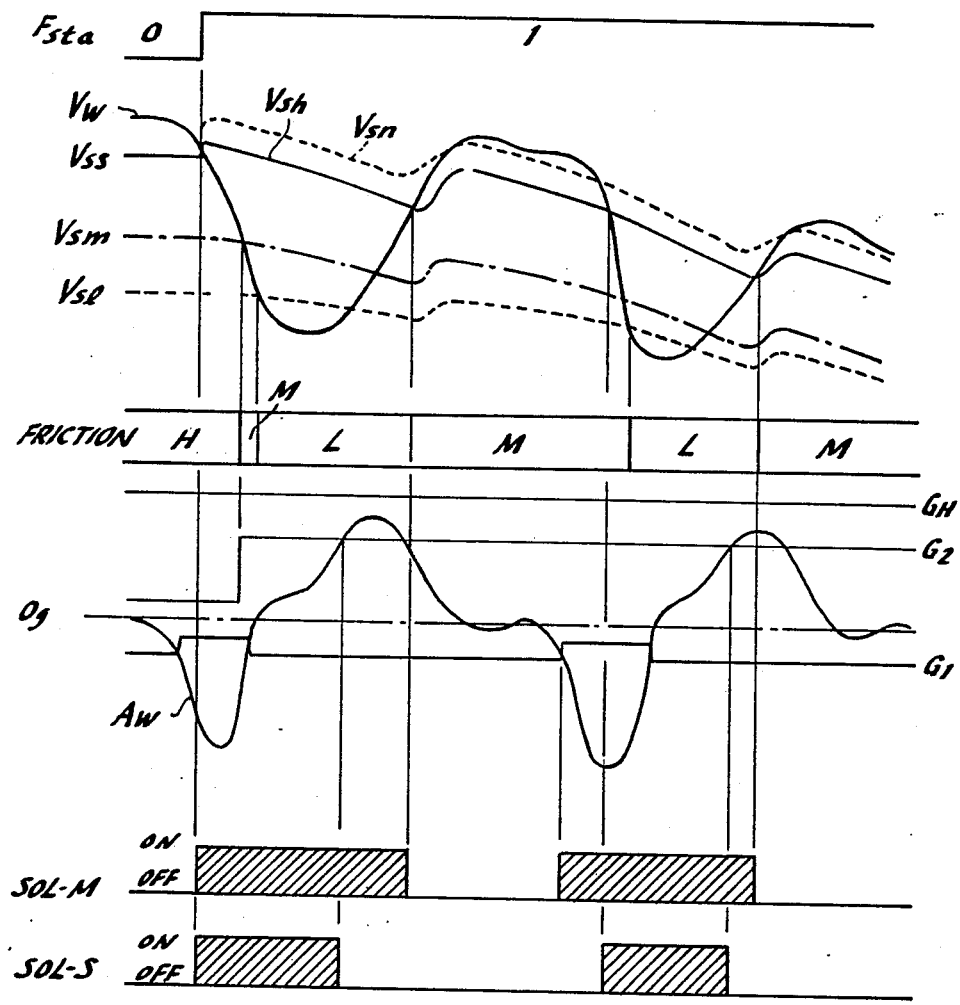

The operation of the solenoids according to FIG. 13 will be better understood with reference to FIGS. 14 to 16.

FIG. 14 illustrates a first example in which surface friction level briefly switches to a medium level "M" from a high friction level "H", control is passed through blocks 603, 604 and 605 and threshold $G_2$ is raised to $G_2'$. Thus, the turn-off timing of the pressure up/down pressure control solenoid SOL-M is accordingly delayed. This delaying action prolongs the down-pressure operation and prevents insufficient loosening of brakes.

FIG. 15 illustrates a second example in which it is assumed that a medium surface friction level continues. The down-pressure end timing threshold $G_2$ is raised to the higher level $G_2'$ as surface friction changes from "high" to "medium" and this higher level continues as long as the medium friction level is detected, and down-pressure operation is thus effected for a longer time on medium friction roads than is effected on high friction roads. This serves to prevent wheel lock conditions.

FIG. 16 indicates a third example in which medium and low friction levels occur in alternate fashion. When friction level changes from "medium" to "low", down-pressure end timing threshold $G_2$ is raised to a level which is higher than the level that is maintained on medium friction roads and down-pressure operation is terminated when wheel speed Vw exceeds Vsh simultaneously with the acceleration exceeding the raised $G_2$ level. Thus, down-pressure operation is performed for an interval longer than is effected on medium friction roads. This prevents wheel lock conditions which are more likely to occur on low friction roads than on medium friction roads.

It is seen therefore that down-pressure operation is provided for a short interval on high friction roads, for a medium interval on medium friction roads and for a longer interval on low friction roads.

Control is now advanced to block 206 to check if a down-pressure mode is selected and if so, a down-pressure time counter $C_{dpt}$ is incremented by one, in block 207, and if not, this counter is reset in block 208.

In block 209, the microprocessor 35a checks if down-pressure time counter $C_{dpt}$ exceeds a preset limit, typically 3 seconds, and, if so, the actuators 17-19 are deenergized in block 204 and, if not, control is passed to block 210 to detect if the selected mode is an up-pressure mode and, if so, an up-pressure time counter $C_{upt}$ is incremented by one in block 211, and, if not, this counter is reset in block 212. If the counter $C_{upt}$ indicates a 3-second period (block 213), actuators are deenergized, and, if not, they remain energized (block 214).

Figure 17:
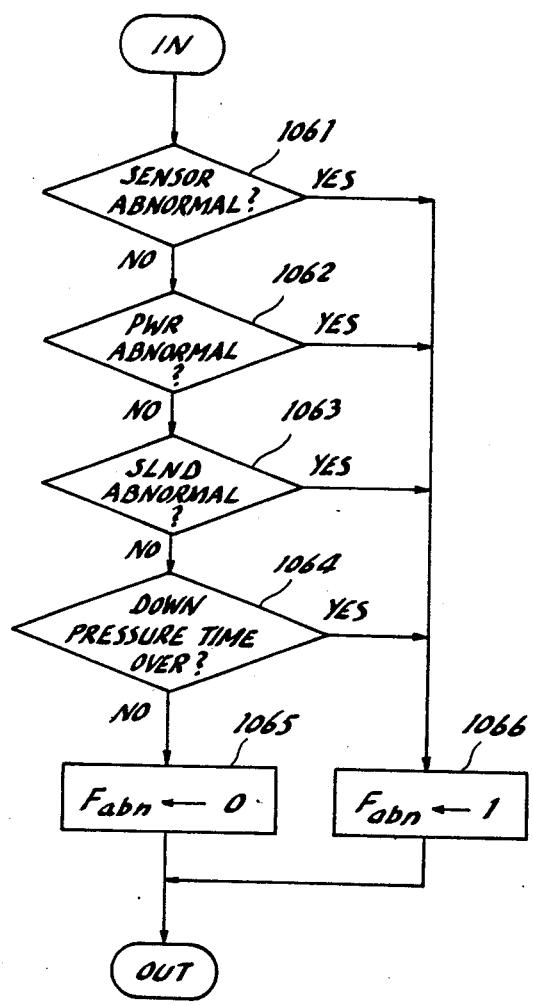
FIG. 17 is a flow diagram describing the system check subroutine of FIG. 5.

Subroutine 105 is followed by a system check subroutine 106 in which the microprocessor 35a checks system functions for abnormal conditions. As shown in FIG. 17, the subroutine 106 comprises blocks 1061 to 1066. In block 1061, wheel speed sensors 5-7 are checked for abnormalities such as disconnection and short-circuit conditions. The source voltage of the power circuit is checked in block 1062 for under- or over-voltage conditions. Actuator solenoids are checked in block 1063 for disconnection and short-circuit conditions, and the down pressure operation is checked in block 1064 for abnormal prolongation. If all these functions are normal, control is passed to block 1065 to reset an abnormal flag $F_{abn}$, and if any abnormality is detected, abnormal flag $F_{abn}$ is set up in block 1066.

The microprocessor 35i a proceeds to a step 107, FIG. 5, to check the status of abnormal flag $F_{abn}$. If $F_{abn}=0$, indicating that no abnormality is detected, control is jumped to subroutine 102 to repeat the executions described above, and, if $F_{abn}=1$, control is passed to a subroutine 108. A control signal is applied to the indicator driver 40 which causes the driver 40 to latches and drive the warning light 25 to alert the vehicle occupant.

A fail-safe subroutine 109 is executed by energizing the cut-off relay 24 to cut off the circuits to the actuators 17-19. Thus, the system is allowed to operate in a manual mode in which the brake pressure is applied in response to the depression of brake pedal 13 in the usual manner. It is preferable that an arrangement be made to cut off the input circuits to the actuator drivers 36-38 to ensure against the abnormality of cut-off relay 24.

What is claimed is:

1. An antiskid control system for the hydraulic braking system of a wheeled vehicle having means for decreasing the fluid pressure of the braking system at a variable rate comprising:
   means for detecting the speed of a vehicle wheel; and
   data processing means programmed to perform the steps of:
   (a) deriving an acceleration of the wheel from the detected wheel speed;
   (b) detecting the speed of said vehicle;
   (c) deriving a speed threshold from the vehicle speed and first and second acceleration thresholds from the vehicle speed, said second acceleration threshold being higher than said first acceleration threshold;
   (d) detecting whether the wheel speed is higher or lower than said speed threshold and detecting whether the wheel acceleration is lower than said first acceleration threshold or equal to or higher than said second acceleration threshold; and
   (e) activating said pressure decreasing means in response to the wheel acceleration being detected as being lower than said first acceleration threshold;
   (f) deactivating said pressure decreasing means, when the wheel speed is detected as being higher than said speed threshold, in response to the wheel acceleration being detected as being equal to or higher than said second acceleration threshold; and
   (g) deactivating said pressure decreasing means, when the wheel speed is detected as being lower than said speed threshold, at a predetermined amount of time following the time at which said wheel acceleration is detected as being equal to or higher than said second acceleration threshold.

2. An antiskid control system for the hydraulic braking system of a wheeled vehicle, comprising:
   (a) wheel speed detecting means for detecting the speed of rotation of at least one of said wheels; and
   (b) wheel acceleration detecting means for detecting the acceleration of said wheel;
   (c) vehicle speed detecting means for detecting the speed of said vehicle;
   (d) brake control means for applying a brake release signal to said braking system when said wheel acceleration is lower than a first acceleration threshold until said wheel acceleration becomes higher than a second acceleration threshold which is higher than said first acceleration threshold;
   (e) threshold establishing means for deriving from said vehicle speed a speed threshold as an indication that the vehicle is on a low friction road surface; and (f) threshold correcting means for varying said second acceleration threshold to a higher level when said wheel speed is lower than said speed threshold.

3. An antiskid control system for the hydraulic braking system of a wheeled vehicle, comprising:

(a) wheel speed detecting means for detecting the speed of rotation of at least one of said wheels; and (b) wheel acceleration detecting means for detecting the acceleration of said wheel;

(c) vehicle speed detecting means for detecting the speed of said vehicle;

(d) threshold establishing means for deriving from said vehicle speed a first speed threshold as an indication that said vehicle is on a low friction road surface, a second speed threshold lower than said first speed threshold by a predetermined amount and deriving from said vehicle speed a third speed threshold as an indication of a target slip rate when said wheel speed is lower than said second speed threshold, said third speed threshold being higher than said first speed threshold; and (e) brake control means for applying a brake release signal to said braking system when said wheel acceleration is lower than a first acceleration threshold until said wheel acceleration becomes higher than a second acceleration threshold which is higher than said first acceleration threshold if said wheel speed is higher than said second speed threshold following the application of said brake release signal to said braking system or until said wheel speed becomes equal to or higher than said third speed threshold if said wheel speed falls below said second threshold following the application of said brake release signal to said braking system.

4. An antiskid control system for the hydraulic braking system of a wheel vehicle, comprising:

(a) a wheel speed detecting means for detecting the speed of rotation of at least one of said wheels; and (b) wheel acceleration detecting means for detecting the acceleration of said wheel;

(c) vehicle speed detecting means for detecting the speed of said vehicle;

(d) threshold establishing means for deriving from said vehicle speed a first speed threshold as an indication that said vehicle is on a low friction road surface and deriving from said vehicle speed a second speed threshold as an indication of a target slip rate when said wheel speed becomes lower than said first speed threshold, said second speed threshold being higher than said first speed threshold; and (e) brake control means for applying a brake release signal to said braking system when said wheel acceleration is lower than a first acceleration threshold until said wheel acceleration becomes higher than a second acceleration threshold which is higher than said first acceleration threshold if said wheel speed is higher than said first speed threshold following the application of said brake release signal to said braking system or until said wheel speed becomes equal to or higher than said second speed threshold if said wheel speed is lower than said first threshold following the application of said brake release signal to said braking system.

* * * * *